(12) United States Patent
Li et al.

(10) Patent No.: US 12,104,970 B2
(45) Date of Patent: Oct. 1, 2024

(54) PRESSURE SENSING DEVICE, PRESSURE SENSING METHOD AND EQUIPMENT WITH TEMPERATURE COMPENSATION

(71) Applicant: SHENZHEN NEW DEGREE TECHNOLOGY CO., LTD., Guangdong (CN)

(72) Inventors: Hao Li, Guangdong (CN); Xuepeng Lin, Guangdong (CN)

(73) Assignee: SHENZHEN NEW DEGREE TECHNOLOGY CO., LTD., Shenzhen (CN)

( * ) Notice: Subject to any disclaimer, the term of this patent is extended or adjusted under 35 U.S.C. 154(b) by 304 days.

(21) Appl. No.: 17/639,247

(22) PCT Filed: Aug. 30, 2019

(86) PCT No.: PCT/CN2019/103866
§ 371 (c)(1),
(2) Date: Feb. 28, 2022

(87) PCT Pub. No.: WO2021/035743
PCT Pub. Date: Mar. 4, 2021

(65) Prior Publication Data
US 2022/0334011 A1 Oct. 20, 2022

(51) Int. Cl.
*G01L 1/22* (2006.01)
(52) U.S. Cl.
CPC .......... *G01L 1/2281* (2013.01); *G01L 1/2262* (2013.01); *G01L 1/2293* (2013.01)
(58) Field of Classification Search
None
See application file for complete search history.

(56) References Cited

U.S. PATENT DOCUMENTS 5,035,148 A 7/1991 Okada

FOREIGN PATENT DOCUMENTS

| CN | 104990658 A | 10/2015 |
| CN | 104995587 | 10/2015 |

(Continued)

OTHER PUBLICATIONS

International Search Report for PCT/CN2019/103866 dated May 28, 2020, 7 pages.

(Continued)

*Primary Examiner* — Brandi N Hopkins
*Assistant Examiner* — Nigel H Plumb
(74) *Attorney, Agent, or Firm* — Nixon & Vanderhye, P.C.

(57) ABSTRACT

A pressure sensing device is provided. In the pressure sensing device, the rigid structure includes rigid blocks arranged at intervals, and strain amplification zones are formed between every two adjacent rigid blocks. The force sensors include first sensors and second sensors. The first sensors are arranged on the two installation surfaces of the strain amplification zones and capable of following the deformation of the measured object, the second sensors are arranged on the two installation surfaces of the rigid blocks and located close to corresponding first sensors. At least four force sensors are connected to form a bridge circuit, and the bridge circuit is electrically connected to a signal processing circuit, so as to detect deformation of the rigid structure and obtain a force acted on the measured object. An output signal of each of the second sensors serves as a temperature compensation signal of the corresponding first sensors.

13 Claims, 6 Drawing Sheets

(56) References Cited

FOREIGN PATENT DOCUMENTS

| | | | |
|---|---|---|---|
| CN | 205091721 U | | 3/2016 |
| CN | 106643463 | | 5/2017 |
| CN | 206420601 U | | 8/2017 |
| CN | 107924243 | | 4/2018 |
| CN | 108204870 | * | 6/2018 |
| CN | 208653681 | * | 3/2019 |
| EP | 0 227 850 | | 7/1987 |
| GB | 1333167 | | 2/1971 |

OTHER PUBLICATIONS

Written Opinion of the ISA for PCT/CN2019/103866 dated May 28, 2020, 3 pages.

Xu Changsheng, et al. "Testing Technology for lifting and Transporting Machinery", Textbooks for higher education institutions, For mechanical design, manufacturing, and automation majors, Second edition, Oct. 1999, 7 pages.

* cited by examiner

PRESSURE SENSING DEVICE, PRESSURE SENSING METHOD AND EQUIPMENT WITH TEMPERATURE COMPENSATION

CROSS-REFERENCE TO RELATED APPLICATION

This application is a National Stage Appl. filed under 35 USC 371 of International Patent Application No. PCT/CN2019/103866 with an international filing date of Aug. 30, 2019, designating the United States, now pending, the content of which is incorporated herein by reference.

TECHNICAL FIELD

The present application relates to the field of pressure sensing technology, and particularly to a pressure sensing device, a pressure sensing method, and an equipment.

BACKGROUND

Various pressure sensing technologies are existed in the field of pressure sensing. These technologies use different types of sensors, combined with specific structures and circuits, to detect the deformation of a measured object to a certain extent. At present, common technologies may include resistance strain gauges, pressure inductance technology, MEMS (Micro-electromechanical System) pressure sensor technology, micro-strain sensor technology, etc., and these sensors, in addition to the characteristics of pressure sensing, also have the phenomenon of temperature drift, that is, an electrical signal is composed of a pressure signal and a temperature signal. When an equipment performs a pressure detection, the temperature of the device itself changes rapidly, and the temperature signal will be added to the pressure signal, resulting in distortion of the pressure signal.

SUMMARY

One of objectives of embodiments of the present application is to provide a pressure sensing device, a pressure sensing method and an equipment, aiming at solving a problem of pressure signal distortion caused by temperature drift in existing pressure sensing structures.

Solutions provided by the embodiments of the present application may include the following aspects.

In a first aspect, it is provided a pressure sensing device, which includes a rigid structure and force sensors.

The rigid structure is configured to be attached to a measured object and be deformed following a deformation of the measured object. The rigid structure includes rigid blocks arranged at intervals along a predetermined direction, and strain amplification zones are formed between every two adjacent rigid blocks. The structure has two installation surfaces oppositely arranged, and one of the installation surfaces serves as a contact surface with the measured object; and The force sensors include first sensors arranged in the strain amplification zones and capable of following the deformation of the measured object, and second sensors arranged on the rigid blocks and located close to corresponding first sensors. An output signal of each of the second sensors serves as a temperature compensation amount of the corresponding first sensor. The two installation surfaces of the strain amplification zones are respectively provided with at least one of the first sensors. The two installation surfaces of the rigid block are respectively provided with at least one of the second sensors. At least four force sensors are connected to form a bridge circuit, and the bridge circuit is electrically connected to a signal processing circuit to detect deformation of the rigid structure and obtain a force acted on the measured object.

In a second aspect, it is provided a pressure sensing method, which uses the above-mentioned pressure sensing device, and includes the following steps:

attaching the rigid structure to the measured object;

connecting at least four of the force sensors to form the bridge circuit. The bridge circuit is electrically connected to the signal processing circuit to detect the deformation of the rigid structure and to obtain the force acted on the measured object. The output signal of each of the second sensors serves as the temperature compensation amount of the corresponding first sensor.

In a third aspect, it is provided an equipment, which includes a measured object and the above-mentioned pressure sensing device, where the rigid structure is attached to the measured object.

Beneficial effects of the pressure sensing device, the pressure sensing method, and the equipment provided by the embodiments of the present application are that: in the pressure sensing device, the rigid structure includes rigid blocks arranged at intervals, and a strain amplification zone is formed between two adjacent rigid blocks. The force sensors include first sensors and second sensors. The first sensors are arranged on the two installation surfaces of the strain amplification zones and change following the deformation of the measured object. The second sensors are arranged on the two installation surfaces of the rigid blocks and located close to the corresponding first sensors. At least four force sensors are connected to form a bridge circuit. The rigid structure, in use, is attached to the measured object, and the bridge circuit is electrically connected to the signal processing circuit, so as to detect the deformation of the rigid structure and to obtain the force acted on the measured object. When the measured object is deformed by force, the strain of the rigid structure is concentrated in the strain amplification zones, the first sensors obtain a pressure signal, while the pressure signal of the second sensors is close to zero. The temperature signals of the first sensors and the second sensors are close. The output signal of the second sensors serves as a temperature compensation signal of the first sensors, so that a relatively clean pressure signal can be obtained. For the pressure sensing device, the pressure sensing method, and the equipment having the pressure sensing device, the pressure signal in high temperature or low temperature environment is not distorted, so that the pressure sensing device has advantages of easy installation, simple circuit, low cost and small temperature drift and so on.

BRIEF DESCRIPTION OF THE DRAWINGS

In order to explain the solutions in the embodiments of this application more clearly, the drawings that need to be used in the description of the embodiments or the existing technologies will be briefly described herein below. Obviously, the drawings in the following description are merely some embodiments of this application, and for those of ordinary skill in the art other drawings can be obtained on the basis of these drawings without creative labor.

DETAILED DESCRIPTION OF THE EMBODIMENTS

Figure 1:
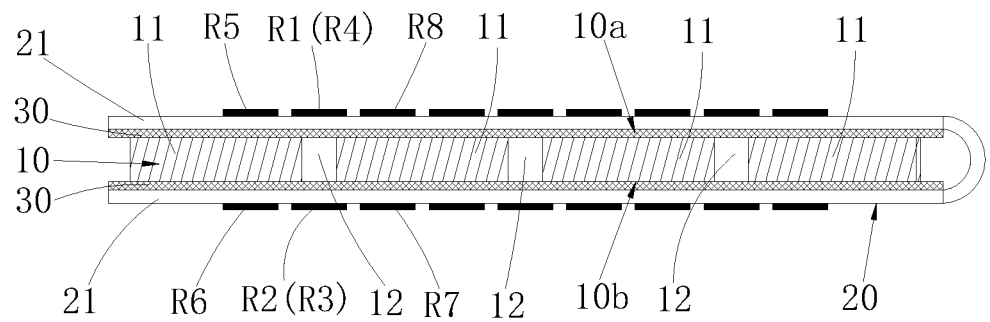
FIG. 1 is an assembly schematic diagram of a pressure sensing device in accordance with an embodiment of the present application.

In order to make the objectives, solutions and advantages of the present application clearer and more understandable, the present application is further described in detail below with reference to the drawings and embodiments hereinafter. It should be understood that the specific embodiments described herein are merely intended to illustrate but not to limit the present application.

In the description of the embodiments of the present application, it should be understood that the terms "length", "width", "upper", "lower", "front", "rear", "left", "right", "vertical", "horizontal", "top", "bottom", "inner", "outer" and other directions or positional relations are based on the positions or positional relations shown in the drawings, and are used only for convenience of describing the embodiments of the present application and simplifying the description, rather than indicating or implying that the device or element referred to must have a specific orientation, be configured and operated in a specific orientation, and therefore cannot be understood as a limitation to the embodiments of the present application.

In addition, the terms "first" and "second" are merely used for the purpose of description, and should not be understood as indicating or implying relative importance or implicitly indicating the number of indicated technical features. Thus, the features defined with "first" and "second" may explicitly or implicitly include one or more of these features. In the description of the present application, the phrase "a plurality of" means two or more, unless otherwise specifically defined.

In the embodiments of the present application, unless otherwise clearly specified and defined, the terms "installed/mounted", "attached to", "connected/coupled", "fixed" and other terms should be understood in a broad sense. For example, it may be fixedly connected or detachably connected or may be integrated; it may be mechanically connected or electrically connected; it may be directly connected or indirectly connected through an intermediate medium, and it may be an internal communication of two components or an interaction relationship between the two components. For those of ordinary skill in the art, the specific meanings of the above-mentioned terms in the embodiments of the present application can be understood according to specific circumstances.

In order to illustrate the solutions of the present application, a detailed description is given below with reference to the specific drawings and embodiments.

Referring to FIGS. 1 to 4, in accordance with some embodiments of the present application, it is provided a pressure sensing device, which includes a rigid structure 10 and force sensors. The rigid structure 10 is configured to be attached to a measured object (not shown) and be deformed following a deformation of the measured object. The rigid structure 10 includes rigid blocks 11 arranged at intervals along a predetermined direction, and strain amplification zones 12 are formed between every two adjacent rigid blocks 11. The rigid structure 10 has two installation surfaces 10a, 10b arranged opposite to each other, and one installation surface 10a serves as a contact surface with the measured object. The force sensors include first sensors R1, R2, which are arranged in the strain amplification zone 12 and capable of following the deformation of the measured object, and second sensors R5, R6, which are arranged on the rigid block 11 and disposed close to the corresponding first sensor R1 (R2), where an output signal of the second sensor R5 (R6) serves as a temperature compensation amount of the first sensor R1 (R2). The two installation surfaces 10a, 10b of the strain amplification zone 12 are respectively provided with at least one first sensor R1, R2. The two installation surfaces 10a, 10b of the rigid block 11 are respectively provided with at least one second sensor R5, R6. At least four force sensors are connected to form a bridge circuit, and the bridge circuit is electrically connected to a signal processing circuit to detect the deformation of the rigid structure 10 and to obtain a force acted on the measured object.

In the pressure sensing device, the rigid structure 10 includes rigid blocks 11 arranged at intervals, and the strain amplification zone 12 is formed between two adjacent rigid blocks 11. The force sensor includes a first sensor R1 (R2) and a second sensor R5 (R6). The first sensors R1, R2 are respectively arranged on the two installation surfaces 10a, 10b of the strain amplification zone 12 and changes following the deformation of the measured object. The second sensors R5, R6 are respectively arranged on the two installation surfaces 10a, 10b of the rigid block 11 and located close to the corresponding first sensor R1, R2. At least four force sensors are connected to form the bridge circuit. The rigid structure 10, in use, is attached to the measured object, and the bridge circuit is electrically connected to the signal processing circuit, so as to detect the deformation of the rigid structure 10 and to obtain the force acted on the measured object. When the measured object is deformed by force, a strain of the rigid structure 10 is concentrated in the strain amplification zone 12, the first sensor R1 (R2) may obtain a pressure signal, while the pressure signal of the second sensor R5 (R6) is close to zero. A temperature signal of the first sensor R1 (R2) is close to the temperature signal of the second sensor R5 (R6), and the output signal of the second sensor R5 (R6) serves as a temperature compensation signal of the first sensor R1 (R2), so that a relatively clean pressure signal can be obtained. The pressure signal detected by the pressure sensing device under high temperature or low temperature environment is not distorted, so that the pressure sensing device has advantages of easy installation, simple circuit, low cost, small temperature drift and so on.

It should be noted that the signal processing circuit is electrically connected to the bridge circuit to analyze and process the electrical signal of the force sensor, and convert an analog signal of force into a digital signal, which belongs to the existing technologies.

In accordance with another embodiment of the present application, the rigid structure 10 has a certain rigidity, the strain amplification zone 12 may be a hollow region, and the first sensor R1 (R2) may be disposed in the strain amplification zone 12. When the measured object is subjected to a force, the rigid structure 10 deforms following the measured object, and the deformation of the strain amplification zone 12 is amplified, so that the deformation of the rigid structure 10 can be detected by the first sensor R1 (R2). Specifically, the rigid structure 10 may be a steel sheet, an aluminum sheet, a glass sheet, a FR4 sheet or other composite rigid materials, which can be selected as required.

In one embodiment, the two installation surfaces 10a, 10b are respectively provided with a flexible substrate 21, and the force sensors respectively arranged on the two installation surfaces 10a, 10b are respectively mounted on the corresponding flexible substrates 21. The flexible substrate 21 attached with the force sensor is pressed onto the discrete rigid block 11 of a certain size through a colloid 30, the first sensor R1 (R2) is directly opposite or adjacent to the strain amplification zone 12, and the second sensor R5 (R6) is directly opposite to the rigid block 11, so that the pressure sensing device is formed, and the structure is easy to assemble. Specifically, the flexible substrate 21 may be FPC (flexible printed circuit board), PET (high temperature resistant polyester film), PI film (polyimide film) or other flexible substrates with good flatness, which can be selected as required.

In one embodiment, two flexible substrates 21 may be formed by bending a mother substrate 20. The force sensor is attached to a mother substrate 20, and then the mother substrate 20 is folded along a center of the mother substrate, and the two inner surfaces are bonded to the two installation surfaces 10a,10b, respectively, which is simple to process and cost efficient.

In one embodiment, the flexible substrates 21 and the installation surface 10a (10b) are bonded through the colloid 30. This structure facilitates a connection between the rigid structure 10 and the flexible substrate 21, and allows the flexible substrate 21 and the rigid structure 10 to be deformed following the deformation of the measured object when the measured object is deformed by a force. The colloid 30 may be made of epoxy adhesive film, 502 adhesive, thermosetting adhesive, silica gel or other materials, which can be selected as required.

In one embodiment, a longitudinal direction of the force sensor and an arrangement direction of the rigid blocks 11 are parallel to each other. This structure facilitates an assembly of the force sensor, and provide a larger deformation amount of the first sensor R1 (R2) when the measured object is pressed, so that the pressure signal can be better output. Specifically, the first sensor R1 (R2) and the corresponding second sensor R5 (R6) are arranged on the same installation surface 10a (10b) close to each other, so that temperature signal of the first sensor R1 (R2) is close to that of the second sensor R5 (R6). the output signal of the second sensor R5 (R6) serves as the temperature compensation signal of the first sensor R1 (R2), and the position of the second sensor R5 (R6) can be adjusted at will. For example, any one of the second sensors R5, R6 may be disposed on one of the rigid blocks 11 adjacent to the strain amplification zone 12.

In one embodiment, at least one second sensor R5 (R6) is split into two or more resistors that are connected in series or in parallel to form an equivalent resistor, and the split resistors are distributed on two rigid blocks adjacent to the strain amplification zone 12. In this way, whether it is pressed in the center of the strain amplification zone 12 or outside the strain amplification zone 12, the temperature signal of the second sensor R5 (R6) is close to the temperature signal of the first sensor R1 (R2), so that the temperature compensation is more balanced.

In one embodiment, the first sensors R1, R2 are respectively arranged on the two installation surfaces 10a, 10b of one or more strain amplification zones 12, the two installation surfaces 10a, 10b of the rigid blocks 11 adjacent to the strain amplification zones 12 are respectively provided with the second sensor R5, R6, and every at least four force sensors are connected to form a bridge circuit to detect a pressure corresponding to the strain amplification zone 12. The number of the strain amplification zones 12 the pressure sensor has may be determined according to the size of a pressure sensing region.

Figure 2:
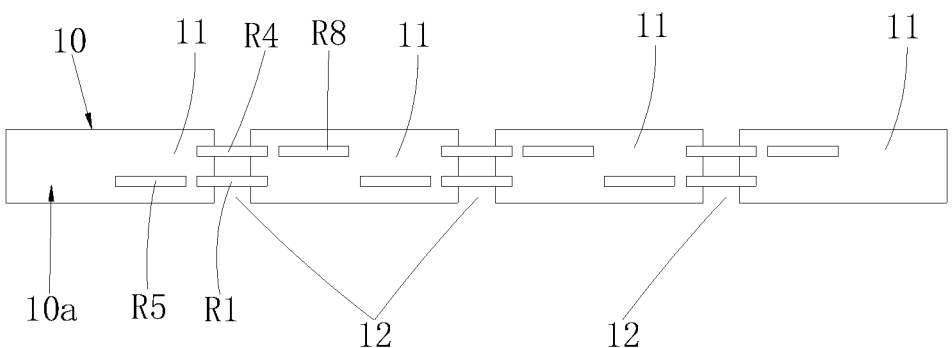
FIG. 2 is a front view of the pressure sensing device in FIG. 1.
Figure 3:
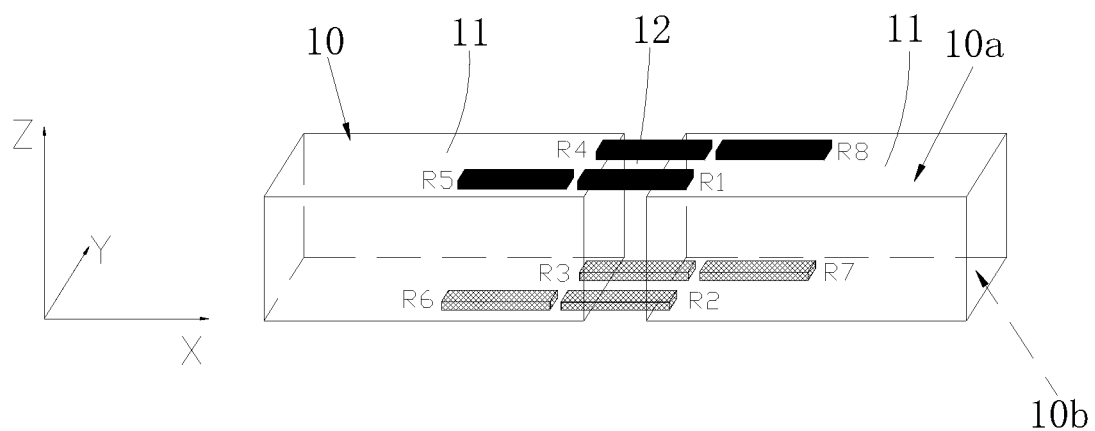
FIG. 3 is a perspective structural view of the pressure sensing device in FIG. 2.
Figure 4:
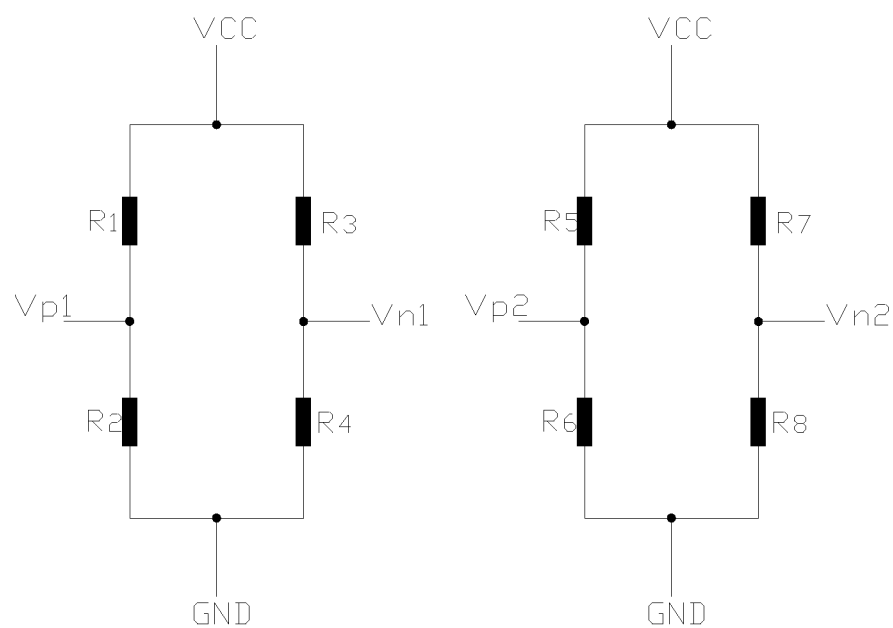
FIG. 4 is a bridge circuit diagram of the pressure sensing device in FIG. 3.

In one embodiment, referring to FIGS. 2 to 4, with respect to one strain amplification zone 12 and the adjacent rigid blocks 11, a full-bridge circuit is provided to implement pressure detection, and another full-bridge circuit is provided to implement temperature compensation.

Specifically, the two installation surfaces 10a, 10b of at least one strain amplification zone 12 are respectively provided with two first sensors R1, R4 and R2, R3, and the four first sensors R1, R2, R3, R4 are connected to form a full-bridge circuit, the two first sensors R1, R4 (R2, R3) located on the same installation surface 10a (10b) serve as a set of opposite bridge arms; the two installation surfaces 10a, 10b of the rigid block 11 adjacent to the strain amplification zone 12 are respectively provided with two second sensors R5, R8 and R6, R7, and the four second sensors R5, R6, R7, R8 are connected to form another full-bridge circuit, and the two second sensors R5, R8 (R6, R7) located on the same installation surface 10a (10b) serve as a set of opposite bridge arms.

FIG. 4 shows a circuit diagram, by setting VCC=Ui, it is obtained that:

$$Vp1=R2Ui/(R1+R2); Vn1=R4Ui/(R3+R4);$$

$$U1=Vp1-Vn1=(R2R3-R1R4)Ui/[(R1+R2)(R3+R4)];$$

By performing derivations of R1, R2, R3 and R4 respectively, it can be seen that U1 increases with the increase of R2 and R3, and decreases with the increase of R1 and R4.

Similarly, it is obtained that:

$$U2=Vp2-Vn2=(R6R7-R5R8)Ui/[(R5+R6)(R7+R8)];$$

Where U2 increases with the increase of R6 and R7, and decreases with the increase of R5 and R8.

It is known that the resistance of the force sensor is affected by deformation and temperature, so both U1 and U2 contain a pressure signal and a temperature signal. Assuming that the pressure signal is F and the temperature signal is T, then:

$$\Delta U1=F1+T1; \Delta U2=F2+T2.$$

Analysis of pressure signal: The pressure sensing device is attached to the measured object. When a force acts on the measured object, the strain of the measured object is concentrated in the strain amplification zone 12 near the position where the force is applied, and the impedance of the force sensor arranged in the strain amplification zone 12 changes accordingly, moreover, the force sensor is electrically connected to the signal processing circuit, thus a pressure signal is generated. By analyzing the characteristics of the pressure signal, the direction, magnitude and position of the applied force can be identified. As the rigid block 11 has a relatively strong rigidity, the deformation of the rigid block 11 itself is very small when the force acts on the measured object. Since the second sensors R5, R6, R7, R8 arranged on the rigid block 11 and changes following the deformation of the rigid block 11, thus the change of the second sensors R5, R6, R7, R8 is also very small. In short, when a force is applied to the measured object, R1 and R4 become smaller, R2 and R3 become larger, and R5, R6, R7 and R8 hardly change, so U1 is a large positive pressure signal, and the pressure signal of U2 is almost zero.

Analysis of temperature signal: Assuming that a resistance value of the force sensor increases with the increase of temperature, the pressure sensing device is in a high temperature state, when the human hand directly presses the measured object, heat will be instantly transferred from the measured object and the pressure sensing device to the human hand. R1 and R4 on the contact surface of the measured object are closer to the human hand, while R2 and R3 on the opposite side are farther from the human hand, so R1 and R4 cool down first and the resistance changes, then R2 and R3 cool down and the resistance changes. At this time, the change of the temperature of the force sensor will generate a larger temperature signal.

Analysis of bad results of signal distortion: After the pressure is removed, the pressure signal F1≈0, the force sensor is still slowly recovering to the original ambient temperature, that is, the temperature signal will slowly drop, at this time U1≈T1. If the temperature signal T1 is greater than a triggering threshold of the pressure, T1 will be mistakenly identified as a pressure signal, resulting in a signal delay.

Below is an analysis of performing temperature compensation to account for temperature delays.

Assuming that the resistance change rate of each force sensor due to the temperature effect is:

$$Kn = \frac{\Delta Rn}{Rn} \ll 1 (n = 1, 2, \ldots 8)$$

$$\Delta Vp1 = \frac{R2 Ui}{R1 + R2} =$$

$$\left(\frac{R2 + \Delta R2}{R1 + R2 + \Delta R1 + \Delta R2} - \frac{R2}{R1 + R2}\right) Ui = \frac{R1 R2}{(R1 + R2)^2}(K1 - K2)Ui$$

Similarly, $$\Delta Vn1 = \frac{R3 R4}{(R3 + R4)^2}(K3 - K4)Ui$$

-continued $$\Delta Vp2 = \frac{R5 R6}{(R5 + R6)^2}(K5 - K6)Uicc$$

$$\Delta Vn2 = \frac{R7 R8}{(R7 + R8)^2}(K7 - K8)Ui$$

$$\therefore \Delta Vp1 - \Delta Vp2 = \left[\frac{R1 R2}{(R1 + R2)^2}(K1 - K2) - \frac{R5 R6}{(R5 + R6)^2}(K5 - K6)\right]Ui$$

Assuming that $\gamma = \frac{R5 R6 (R1 + R2)^2}{R1 R2 (R5 + R6)^2}$ $$\therefore \Delta Vp1 - \Delta Vp2 = \frac{R1 R2}{(R1 + R2)^2}[(K2 - K1) - \gamma(K6 - K5)]Ui$$

Assuming that $\frac{3}{4} \le \frac{R1}{R2} = \frac{R5}{R6} \le \frac{4}{3}$, then $\frac{3}{7} \le \frac{R1}{R1 + R2} = \frac{R5}{R5 + R6} \le \frac{4}{7} \therefore$ $$\frac{3}{7} * \frac{4}{7} \le \frac{R1}{R1 + R2} * \frac{R2}{R1 + R2} \le \frac{1}{2} * \frac{1}{2} \therefore 0.245 \le \frac{R1}{R1 + R2} * \frac{R2}{R1 + R2} \le 0.25$$

Similarly $\therefore$ $$0.245 \le \frac{R5}{R5 + R6} * \frac{R6}{R5 + R6} \le 0.25 \therefore \frac{0.245}{0.25} \le \gamma \le \frac{0.25}{0.245} \therefore \gamma \approx 1$$

$$\therefore \Delta Vp1 - \Delta Vp2 = \frac{R1 R2}{(R1 + R2)^2}[(K2 - K1) - (K6 - K5)]Ui =$$

$$\frac{R1 R2}{(R1 + R2)^2}[(K5 - K1) - (K6 - K2)]Ui$$

Figure 5A:
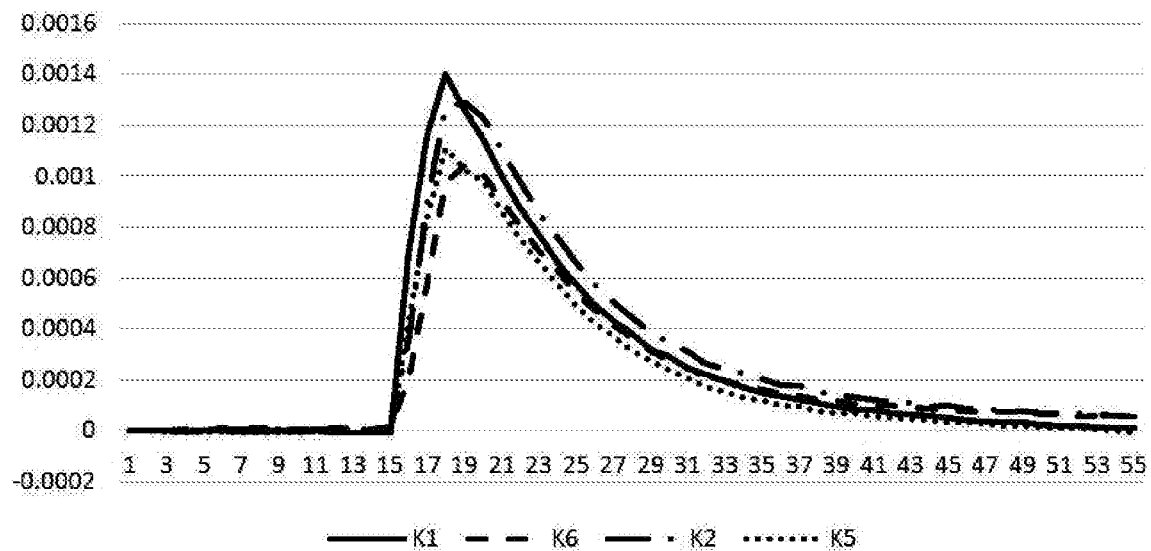
FIG. 5A shows resistance change rate curves of two first sensors and two second sensors in the two bridge circuits in FIG. 4.
Figure 5B:
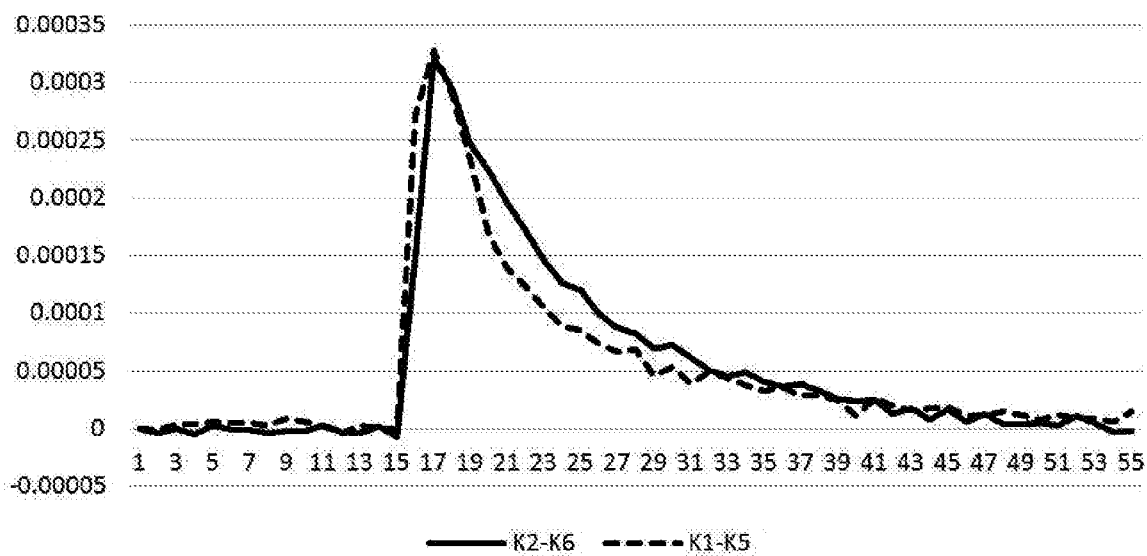
FIG. 5B is a curve diagram showing a difference of resistance change rate between the first sensors and the corresponding second sensors in FIG. 5A.

It is known that R1 and R5 are in the same plane, R2 and R6 are in the same plane, R1 and R2 are disposed on the strain amplification zone 12, and R5 and R6 are disposed on the rigid block 11. When the temperature of the measured object changes instantaneously, K1, K5, K2, K6 will change rapidly with the temperature change. The temperature signals of the two force sensors placed close to each other are close, that is, the resistance change rates of the force sensors are close, and then the difference between the resistance change rates of the two force sensors placed close is close to the difference between the resistance change rates of the other force sensors closely placed, which is K1−K5≈K2−K6. The curve of the difference of the resistance change rate shown in FIG. 5B can be obtained through a difference operation of the measured data shown in FIG. 5A, which can also verify the above conclusion.

So due to the temperature effect Δ Vp1≈Δ Vp2.

Similarly, it can be proved that Δ Vn1≈Δ Vn2 ∴ T1≈T2

It is known that the second sensors R5, R6, R7, and R8 are arranged on the rigid block 11. It can be seen from the above that when pressure is applied to the measured object, F2≈0.

$$\therefore \Delta U2 = F2 + T2 \approx T2$$

$$\therefore \Delta U1 - \Delta U2 = F1 + T1 - (F2 + T2) = F1$$

In actual measurement, T2 is not necessarily exactly equal to T1, but it basically satisfies an equation that T2=β*T1. Among them, β is an undetermined coefficient, ideally β=1, but due to factors such as the characteristics of the force sensor and the manufacturing process, after an actual measurement, β is a fixed coefficient less than 1.

Assuming that T2=β*T1, then: ΔU2=72=β*T1.

Therefore, ΔU1−ΔU2/β=F1+T1−(β*T1)/β=F1.

Figure 6:
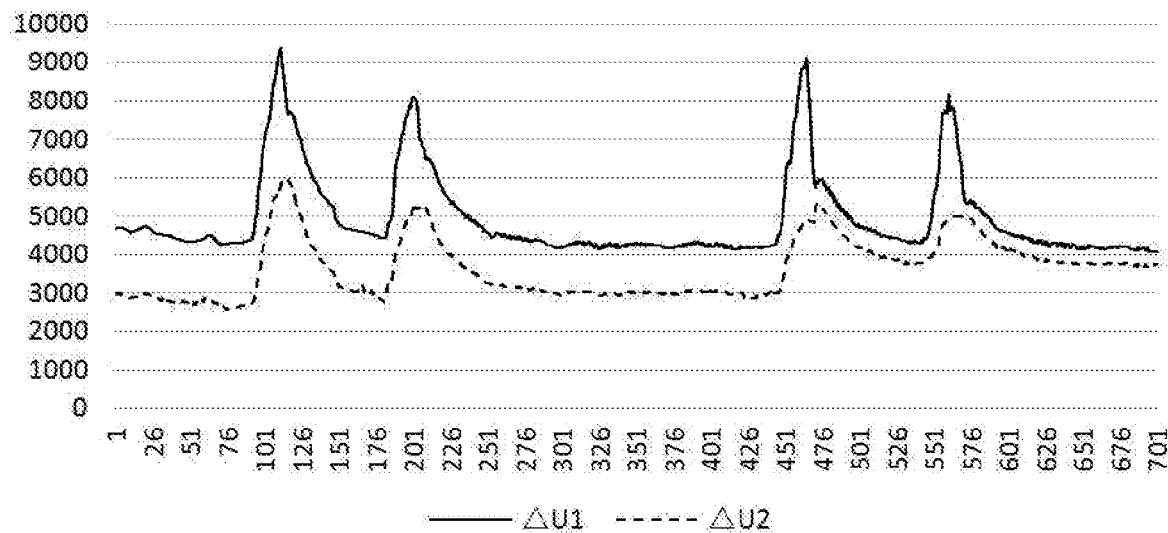
FIG. 6 is an output signal diagram of the two bridge circuits in FIG. 4.

A cleaner pressure signal can be obtained through the equation F1=ΔU1−ΔU2/β. The above conclusion can also be verified by the measured data of the output signals of the two bridge circuits in FIG. 6.

Therefore, a cleaner pressure signal can be obtained by removing the temperature signal by compensating with ΔU2, which effectively solves the signal distortion caused by the temperature effect. Similarly, other channels can also perform temperature compensation in the same way.

Figure 7:
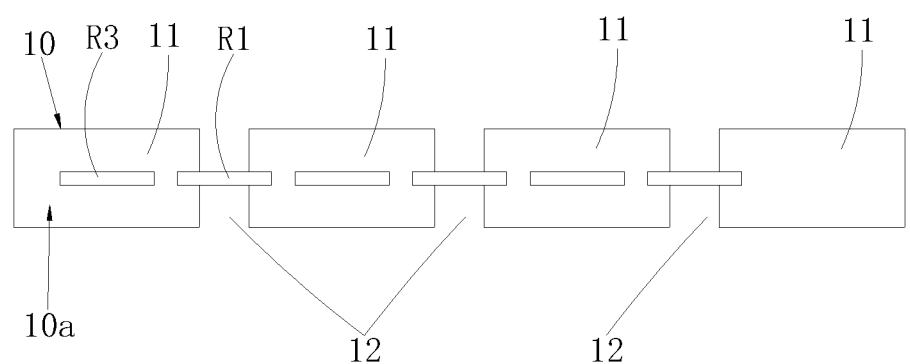
FIG. 7 is a front view of a pressure sensing device in accordance with another embodiment of the present application.
Figure 8:
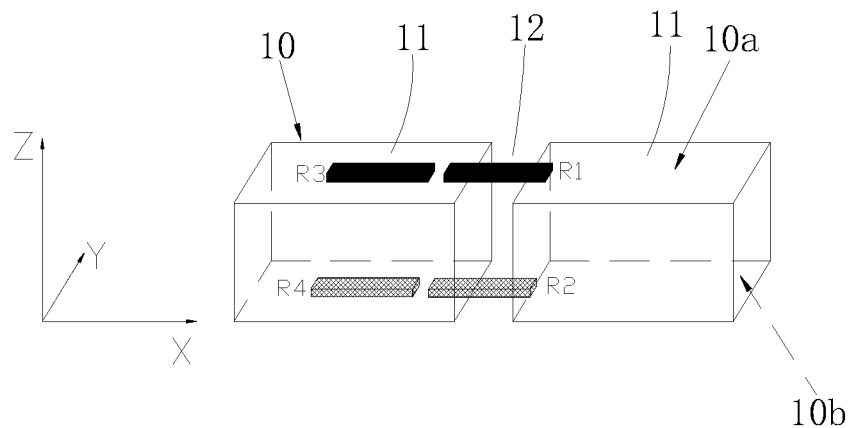
FIG. 8 is a perspective structural view of the pressure sensing device in FIG. 7.
Figure 9:
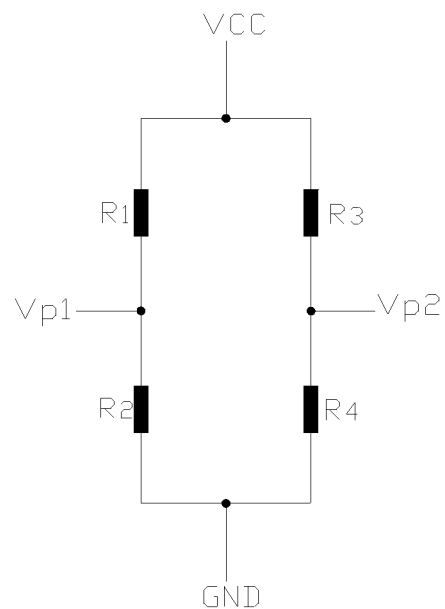
FIG. 9 is a bridge circuit diagram of the pressure sensing device in FIG. 8.

In one embodiment, referring to FIGS. 7 to 9, for one strain amplification zone 12 and the adjacent rigid blocks 11, a half-bridge circuit is provided to implement the pressure detection and temperature compensation. Specifically, the two installation surfaces 10a, 10b of at least one strain amplification zone 12 are respectively provided with a first sensor R1, R2, the two installation surfaces 10a, 10b of the rigid block 11 adjacent to the strain amplification zone 12 are respectively provided with a second sensor R3, R4, and the two first sensors R1, R2 the two second sensors R3, R4 are connected to form a half-bridge circuit, where the first sensor R1 (R2) located on one of the installation surfaces 10a (10b) of the corresponding strain amplification zone 12 and the second sensor R4 (R3) located on the other installation surface 10b (10a) of the corresponding rigid block 11 serve as a set of opposite bridge arms.

FIG. 9 shows a circuit diagram, referring to the above analysis, it can be obtained that:

$$Vp1=R2Ui/(R1+R2); Vp2=R4Ui/(R3+R4);$$

Below is an analysis of performing temperature compensation to account for temperature delays.

Assuming that $Kn = \frac{\Delta Rn}{Rn} \ll 1 (n = 1, 2, 3, 4)$ and $\frac{3}{4} \leq \frac{R1}{R2} = \frac{R3}{R4} \leq \frac{4}{3}$ Then, $\Delta Vp1 - \Delta Vp2 = \frac{R1R2}{(R1+R2)^2}[(K2-K1)-(K4-K3)]Ui$ It is known that: $\Delta$ Vp1=F1+T1; $\Delta$ Vp2=F2+T2.

Analysis of pressure signal: When a pressure is applied to the measured object, R1 decreases, R2 increases, R3 and R4 are almost unchanged, F1 is a large positive signal, and F2≈0.

Temperature effect: When a pressure is applied to the measured object, the resistance change rate of the force sensor caused by the temperature change satisfies that:

$$K2-K1 \approx K4-K3$$

$$\therefore T1 \approx T2$$

$$\therefore \Delta VP1 - \Delta VP2 = F1+T1-T2$$

In an actual measurement during a pressure evacuation stage, T2 is not necessarily exactly equal to T1, but it basically satisfies that T2=βT1. In which, β is an undetermined coefficient, ideally β=1, but due to factors such as the characteristics of the force sensor and the manufacturing process, after the actual measurement, β is a fixed coefficient less than 1. Assuming that 0.9<β<1, then, $$F1=\Delta VP1-\Delta VP2=F1+T1-\beta T1=F1+(1-\beta)T1;$$

At this time, most of T1 has been compensated, and only a ratio of less than 0.1 remains. Thus, most of the temperature signals can be basically compensated with F1=$\Delta$ VP1–$\Delta$ VP2, and the temperature delay caused by the temperature effect can be effectively solved. In this way, the requirement for the number of channels can be reduced, and the requirement of the force sensor can also be reduced, so that the pressure sensing device can be made smaller and cost efficient.

Figure 10:
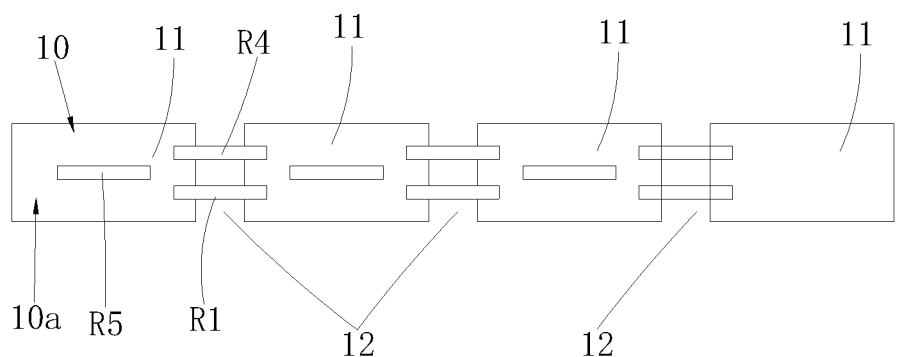
FIG. 10 is a front view of a pressure sensing device in accordance with another embodiment of the present application.
Figure 11:
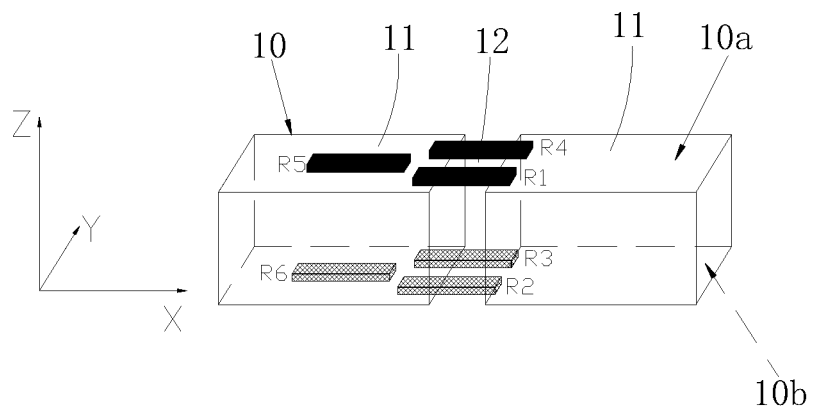
FIG. 11 is a perspective structural view of the pressure sensing device in FIG. 10.
Figure 12:
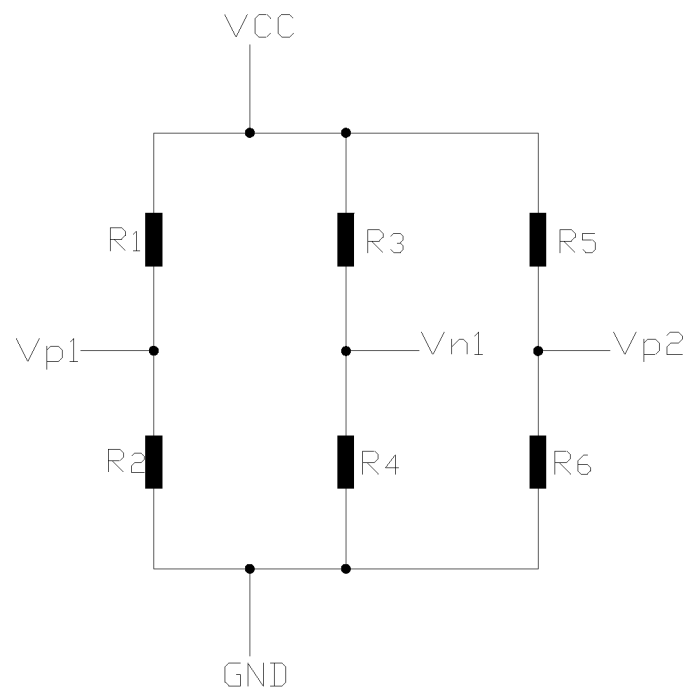
FIG. 12 is a bridge circuit diagram of the pressure sensing device in FIG. 11.

In one embodiment, referring to FIGS. 10 to 12, for one strain amplification zone 12 and the adjacent rigid blocks 11, a full bridge circuit is provided to implement pressure detection, and a half bridge is added to implement temperature compensation. Specifically, the two installation surfaces 10a, 10b of the at least one strain amplification zone 12 are respectively provided with two first sensors R1, R4 and R2, R3, and the four first sensors R1, R2, R3, R4 are connected to form a full Bridge circuit, two first sensors R1, R4 (R2, R3) located on the same installation surface 10a (10b) as a set of opposite bridge arms. The two installation surfaces 10a, 10b of the rigid block 11 adjacent to the strain amplification zone 12 are respectively provided with a second sensor R5, R6, and the two second sensors R5, R6 are respectively connected with the two first sensors R1, R2 respectively located on the two installation surfaces 10a,10b to form a half-bridge circuit, The first sensor R1 (R2) located on one installation surface 10a (10b) corresponding to the strain amplification zone 12 and the second sensor R6 (R5) located on the other installation surface 10b (10a) corresponding to the rigid block 11 serve as a set of opposite bridge arms.

FIG. 12 shows the circuit diagram, referring to the above analysis, it can be obtained that:

$$Vp1=R2Ui/(R1+R2); Vn1=R4Ui/(R3+R4); Vp2=R6Ui/(R5+R6);$$

$$U1=Vp1-Vn1=(R2R3-R1R4)Ui/[(R1+R2)(R3+R4)];$$

$$U2=Vp1-Vp2=(R2R5-R1R6)Ui/[(R1+R2)(R5+R6)];$$

$$\Delta U1=\Delta Vp1-\Delta Vn1=F1+T1$$

$$\Delta U2=\Delta Vp1-\Delta Vp2=F2+T2$$

In actual measurement, T2 is not necessarily exactly equal to T1, but it basically satisfies that F2=αF1; T2=βT1. In which, α, β are undetermined coefficients. Ideally, α=½, because F2 is mainly reflected on the deformation of the force sensors R1 and R2, but R5 and R6 on the rigid block are also deformed. In actual measurement, F2≈0.45F1, so α≈0.45. Ideally, β=1, but due to factors such as the characteristics of the force sensor and the manufacturing process, after the actual measurement, β is a fixed coefficient less than 1. A relatively clean pressure signal can be obtained through the formula F1=($\Delta$ U2–β $\Delta$ U1)/(α–β), thereby a relatively effective temperature compensation can be implemented. The advantage of this scheme is that only one half-bridge is added on the basis of the full-bridge circuit, which can perform effective temperature compensation without losing the pressure signal.

Figure 13:
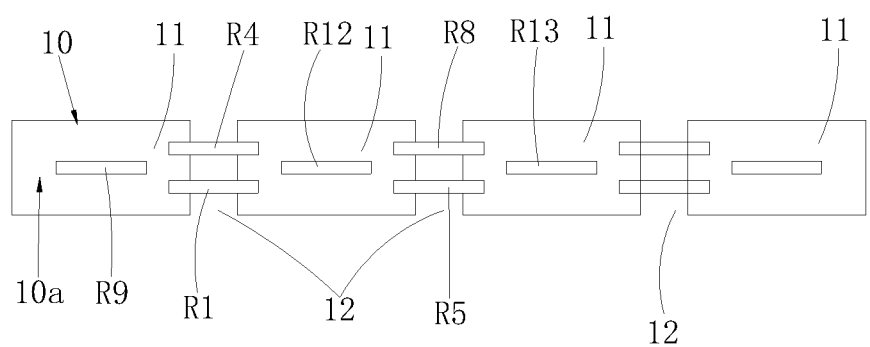
FIG. 13 is a front view of a pressure sensing device in accordance with yet another embodiment of the present application.
Figure 14:
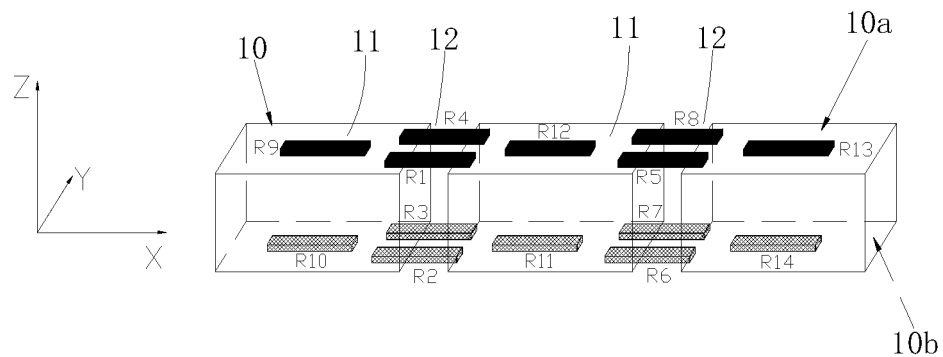
FIG. 14 is a perspective structural view of the pressure sensing device in FIG. 13.
Figure 15:
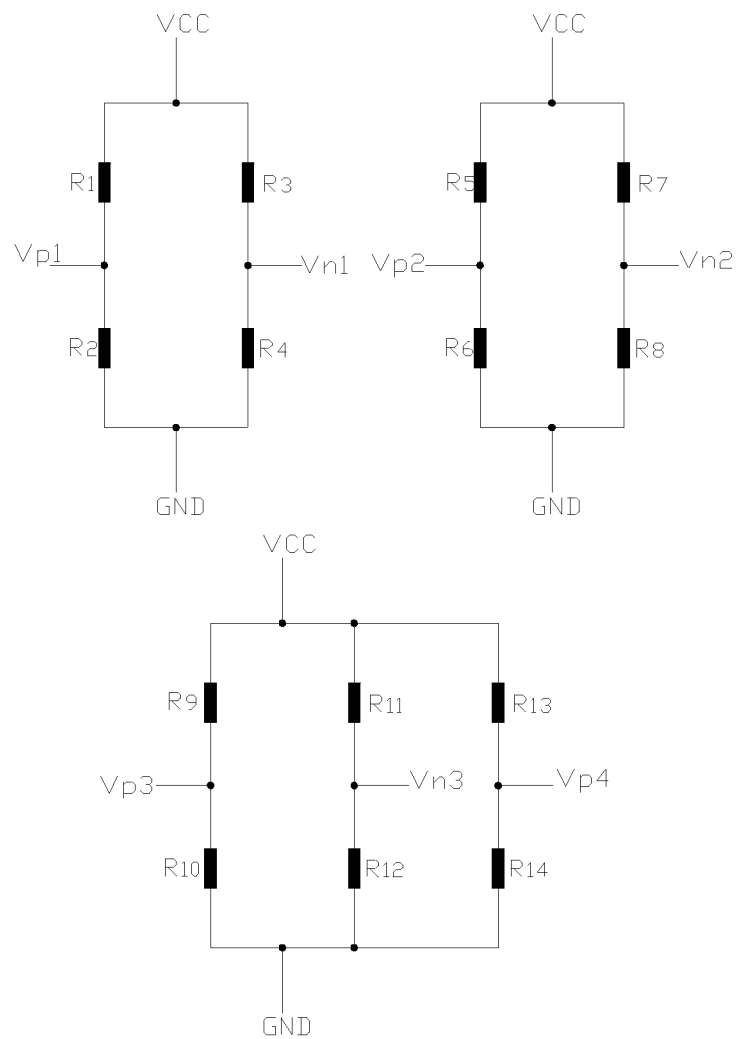
FIG. 15 is a bridge circuit diagram of the pressure sensing device in FIG. 14.

In one embodiment, referring to FIG. 13 to FIG. 15, for at least two strain amplification zones 12 and the adjacent rigid blocks 11, one of the strain amplification zones 12 is provided with a full bridge circuit to implement pressure detection, and another full bridge circuit to implement temperature compensation. The other strain amplification zone 12 is also provided with another full bridge circuit to implement pressure detection, but a half bridge to implement temperature compensation. Specifically, at least two adjacent strain amplification zones 12 are provided. The two installation surfaces 10a, 10b of one strain amplification zone 12 are provided with two first sensors R1, R4 and R2, R3 respectively. The four first sensors R1, R2, R3, R4 corresponding to the same strain amplification zone 12 are connected to form a full bridge circuit, and the two first sensors R1, R4 (R2, R3) located on the same installation surface 10a (10b) serve as a set of opposite bridge arms. The two installation surfaces 10a, 10b of each rigid block 11 adjacent to the strain amplification zone 12 are respectively provided with a second sensor R9, R10, R11, R12. The four second sensors R9, R10, R11, R12 on the two rigid blocks 11 adjacent to the same strain amplification zone 12 are connected to form the other full bridge circuit, and the two second sensors R9, R12 (R10, R11) located on the same installation surface 10a (10b) serve as a set of opposite bridge arms.

The two installation surfaces 10a, 10b of the other strain amplification zone 12 are respectively provided with two first sensors R5, R8 and R6, R7. The four first sensors R5, R6, R7, R8 corresponding to this strain amplification zone 12 are connected to form a full bridge circuit, and the two first sensors R5, R8 (R6, R7) located on the same installation surface 10a (10b) serve as a set of opposite bridge arms. The two installation surfaces 10a, 10b of one of the rigid blocks 11 adjacent to this strain amplification zone 12 have been respectively provided with one second sensor R11, R12, and the two installation surfaces 10a, 10b of the other rigid block 11 adjacent to the strain amplification zone 12 are respectively provided with one second sensor R13, R14. The four second sensors R11, R12, R13, R14 on the two rigid blocks 11 adjacent to the strain amplification zone 12 are connected to form another full bridge circuit. The two second sensors R12, R13 (R11, R14) located on the same installation surface 10a (10b) serve as a set of opposite bridge arms. Two adjacent full-bridge circuits formed by connecting four second sensors share a series branch formed by two second sensors R11, R12.

FIG. 15 shows a circuit diagram, referring to the above analysis, it can be obtained that:

$$\Delta U1 = \Delta Vp1 - \Delta Vn1 = F1 + T1$$

$$\Delta U2 = \Delta Vp2 - \Delta Vn2 = F2 + T2$$

$$\Delta U3 = \Delta Vp3 - \Delta Vn3 = F3 + T3$$

$$\Delta U4 = \Delta Vp4 - \Delta Vn3 = F4 + T4$$

It can be seen from the above that $\Delta U3$ can perform temperature compensation on $\Delta U1$, and $\Delta U4$ can perform temperature compensation on $\Delta U2$. The difference is that $\Delta U3$ and $\Delta U4$ share the output signal Vn3 of the detection terminal on the series branch of the second sensors R11, R12. By analogy, for each additional strain amplification zone 12, only one more half-bridge needs to be added, and the temperature compensation for the full-bridge circuit signal of the strain amplification zone 12 can be well implemented. This solution reduces the space requirement of the force sensor, enables the pressure sensing device to be made smaller, and saves costs.

In one embodiment, the force sensor is a strain sensing resistor, and the strain sensing resistor may be made of at least one of the following materials including poly-crystalline semiconductor materials, amorphous semiconductor materials, poly-crystalline silicon, graphene, copper-nickel alloys, carbon nanotubes, thin metal wires, and conductor-insulator composite materials. All of the above solutions can achieve pressure sensing and can be selected as required.

In accordance with some embodiments of the present application, it is provided a pressure sensing method which uses the pressure sensing device as above-mentioned and includes the following steps: attaching the rigid structure 10 to the measured object; and connecting at least four force sensors to form a bridge circuit. The bridge circuit is electrically connected to the signal processing circuit to detect the deformation of the rigid structure 10 and to obtain the force acted on the measured object, and the output signal of the second sensor serves as the temperature compensation amount of the corresponding first sensor.

In the pressure sensing device, the rigid structure 10 includes rigid blocks 11 arranged at intervals, and a strain amplification zone 12 is formed between two adjacent rigid blocks 11. The force sensor includes a first sensor and a second sensor. The first sensor is arranged on the two installation surfaces 10a, 10b of the strain amplification zone 12 and follows the deformation of the measured object. The second sensors are respectively arranged on the two installation surfaces 10a, 10b of the rigid block 11 and located close to the corresponding first sensor. At least four force sensors are connected to form a bridge circuit. The rigid structure 10, in use, is attached to the measured object, and the bridge circuit is electrically connected to the signal processing circuit, so that the deformation of the rigid structure 10 can be detected and the force acted on the measured object can be obtained. When the measured object is deformed by force, the strain of the rigid structure 10 is concentrated in the strain amplification zone 12, the first sensor obtains a pressure signal, while the pressure signal of the second sensor is close to zero. The temperature signals of the first sensor and the second sensor are close. The output signal of the second sensor serves as the temperature compensation signal of the first sensor, so that a relatively clean pressure signal can be obtained. The pressure sensing method uses the pressure sensing device, through which the pressure signal is not distorted under high temperature or low temperature environment, which has the advantages of easy installation, simple circuit, low cost, small temperature drift and so on.

In accordance with some embodiments of the present application, it is provided an equipment which includes a measured object and the pressure sensing device as above-mentioned. The rigid structure 10 is attached to the measured object. As the equipment includes all features of the solutions in the above-mentioned embodiments, the equipment also has all beneficial effects brought by these solutions in the above-mentioned embodiments, which will not be repeated here.

In another embodiment of the present application, the measured object may be a panel or a frame, and a force sensing of the panel or frame may be achieved. The panel or frame may be made of non-metallic materials such as glass, plastic, ceramics, etc. The panel may be a touch screen, a display or other electronic terminal with rigid structure 10. The frame can be a frame of various electronic terminals. By connecting the force sensor to the panel or frame, it is possible to accurately identify the size of the touch pressure, which expands the application space for electronic terminals in product application, human-computer interaction and consumer experience. The user can directly obtain the precise force level and quantity by touching the touch screen, the display or the electronic terminal.

In one embodiment, the pressure sensing device is attached to a surface of the measured object through a colloid (not shown), which may be easy to assemble. When the measured object is subjected to a force, the rigid structure 10 deforms following the deformation of the measured object, the deformation of the strain amplification zone 12 is amplified, and the impedance of the force sensor changes accordingly. The force sensor is electrically connected to the signal processing circuit, thereby generating a pressure signal. By analyzing the characteristics of the pressure signal, the direction, magnitude and location of the force applied can be identified. Specifically, the colloid may be VHB, double-sided adhesive, 502 adhesive, thermosetting adhesive, etc., which can be selected as required.

The forgoing are only optional embodiments of the present application, and are not intended to limit the present application. For those skilled in the art, various modifications and variations of this application are possible. Any modification, equivalent replacement, improvement, and the like, which are made within the fundamental designs and the principle of the present application, should all be included in the protection scope of the present application.

What is claimed is:

1. A pressure sensing device, comprising:
a rigid structure, configured to be attached to a measured object and be deformed following deformation of the measured object, and comprising:
rigid blocks, arranged at intervals along a predetermined direction; and
strain amplification zones, each of which is formed between adjacent pairs of the rigid blocks,
wherein the rigid structure has first and second installation surfaces arranged opposite to each other, and one of the first and second installation surfaces serves as a contact surface with the measured object; and
force sensors, comprising:
first sensors, arranged in the strain amplification zones and capable of following the deformation of the measured object; and
second sensors, arranged on the rigid blocks and located adjacent to corresponding first sensors,
wherein an output signal of each of the second sensors serves as a temperature compensation amount of a corresponding first sensor; at least one of the first sensors is respectively arranged on each of the first and second installation surfaces of the strain amplification zones; at least one of the second sensors is respectively arranged on each of the first and second installation surfaces of the rigid blocks; and wherein at least four of the force sensors are connected to form a bridge circuit electrically connected to a signal processing circuit to detect the deformation of the rigid structure and to obtain a force acting on the measured object,
wherein, for at least one of the strain amplification zones formed between the adjacent pairs of the rigid blocks, a full-bridge circuit is provided to implement pressure detection, and another full-bridge circuit is provided to implement temperature compensation;
or alternatively, for the at least one of the strain amplification zones formed between the adjacent pairs of the rigid blocks, a half-bridge circuit is provided to implement the pressure detection and the temperature compensation;
or alternatively, for the at least one of the strain amplification zones formed between the adjacent pairs of the rigid blocks, a full bridge circuit is provided to implement the pressure detection, and a half bridge is added to implement the temperature compensation;
or alternatively, for at least two of the strain amplification zones and the corresponding adjacent pairs of the rigid blocks, a first strain amplification zone is provided with a full bridge circuit to implement the pressure detection, and another full bridge circuit to implement the temperature compensation, and a second strain amplification zone is provided with another full bridge circuit to implement the pressure detection, and a half bridge circuit to implement the temperature compensation.

2. The pressure sensing device according to claim 1, wherein the first installation surface is provided with a first flexible substrate, the second installation surface is provided with a second flexible substrate, and the force sensors respectively arranged on the first and second installation surfaces are respectively mounted on the corresponding first and second flexible substrates.

3. The pressure sensing device according to claim 2, wherein first and second flexible substrates are formed by bending a mother substrate.

4. The pressure sensing device according to claim 2, wherein the first and second flexible substrates and each of the first and second installation surfaces are bonded through a colloid.

5. The pressure sensing device according to claim 1, wherein a longitudinal direction of each of the force sensors and an arrangement direction of the rigid blocks are parallel to each other.

6. The pressure sensing device according to claim 1, wherein at least one of the second sensors is split into two or more split resistors that are connected in series or in parallel to form an equivalent resistor, and the one or more split resistors are distributed on two of the rigid blocks adjacent to one of the strain amplification zones.

7. The pressure sensing device according to claim 1, wherein the first and second installation surfaces of at least one of the strain amplification zones are respectively provided with two of the first sensors, and the four of the first sensors are connected to form a full-bridge circuit, in which the two of the first sensors located on the same installation surface serve as a set of opposite bridge arms;
the first and second installation surfaces of the rigid blocks adjacent to one of the strain amplification zones are respectively provided with two of the second sensors, and the four of the second sensors are connected to form another full-bridge circuit in which the two of the second sensors located on the same installation surface serve as a set of opposite bridge arms;
or alternatively, the first and second installation surfaces of at least one of the strain amplification zones are respectively provided with one of the first sensors, and the first and second installation surfaces of the rigid block adjacent to the strain amplification zone are respectively provided with one of the second sensors, the two of the first sensors and the two of the second sensors are connected to form a half-bridge circuit, in which the first sensor located on the first installation surface corresponding to the strain amplification zone and the second sensor located on the second installation surface corresponding to the rigid block serve as a set of opposite bridge arms;
or alternatively, the first and second installation surfaces of at least one of the strain amplification zones are respectively provided with two of the first sensors, and the four of the first sensors are connected to form a full bridge circuit, in which the two of the first sensors located on the first installation surface serve as a set of opposite bridge arms;
the first and second installation surfaces of the rigid blocks adjacent to one of the strain amplification zones are respectively provided with one of the second sensors, and the two of the second sensors and the two of the first sensors respectively located on the first and second installation surfaces are connected to form a half-bridge circuit, in which the first sensor located on of the first installation surfaces corresponding to the strain amplification zone and the second sensor located on the second installation surface corresponding to the rigid block serve as a set of opposite bridge arms;
or alternatively, the first and second installation surfaces of the at least two adjacent strain amplification zones are respectively provided with two of the first sensors, and the four of the first sensors corresponding to the same strain amplification zone are connected to form a full-bridge circuit, in which the two of the first sensors on the same installation surface serve as a set of opposite bridge arms;

the first and second installation surfaces of each rigid block adjacent to one of the strain amplification zones are respectively provided with one of the second sensors, and the four of the second sensors located on two of the rigid blocks adjacent to the same strain amplification zone are connected to form another full bridge circuit, in which the two of the second sensors located on the same installation surface serve as a set of opposite bridge arms, wherein two adjacent full bridge circuits formed by the four of the second sensors share a series branch consisted of the two of the second sensors.

8. The pressure sensing device according to claim 1, wherein each of the force sensors is a strain sensing resistor comprising at least one of poly-crystalline semiconductor materials, amorphous semiconductor materials, poly-crystalline silicon, graphene, copper-nickel alloys, carbon nanotubes, thin metal wires, or conductor-insulator composite materials.

9. The pressure sensing device according to claim 1, wherein the rigid structure comprises a steel sheet, an aluminum sheet, a glass sheet or an FR4 sheet.

10. A pressure sensing method, using a pressure sensing device, comprising:
attaching a rigid structure to a measured object; the rigid structure configured to be deformed following deformation of the measured object, the rigid structure comprising:
rigid blocks, arranged at intervals along a predetermined direction; and
strain amplification zones, each of which is formed between adjacent pairs of the rigid blocks,
wherein the rigid structure has first and second installation surfaces arranged opposite to each other, and one of the first and second installation surfaces serves as a contact surface with the measured object; and
connecting at least four force sensors to form a bridge circuit, the force sensors, comprising:
first sensors, arranged in the strain amplification zones and capable of following the deformation of the measured object; and
second sensors, arranged on the rigid blocks and located adjacent to corresponding first sensors,
wherein an output signal of each of the second sensors serves as a temperature compensation amount of a corresponding first sensor; at least one of the first sensors is respectively arranged on each of the first and second installation surfaces of the strain amplification zones; at least one of the second sensors is respectively arranged on each of the first and second installation surfaces of the rigid blocks; and wherein at least four of the force sensors are connected to form a bridge circuit electrically connected to a signal processing circuit to detect the deformation of the rigid structure and to obtain a force acting on the measured object,
wherein, for at least one of the strain amplification zones formed between the adjacent pairs of the rigid blocks, a full-bridge circuit is provided to implement pressure detection, and another full-bridge circuit is provided to implement temperature compensation;

or alternatively, for the at least one of the strain amplification zones formed between the adjacent pairs of the rigid blocks, a half-bridge circuit is provided to implement the pressure detection and the temperature compensation;

or alternatively, for the at least one of the strain amplification zones formed between the adjacent pairs of the rigid blocks, a full bridge circuit is provided to implement the pressure detection, and a half bridge is added to implement the temperature compensation;

or alternatively, for at least two of the strain amplification zones and the corresponding adjacent pairs of the rigid blocks, a first strain amplification zone is provided with a full bridge circuit to implement the pressure detection, and another full bridge circuit to implement the temperature compensation, and a second strain amplification zone is provided with another full bridge circuit to implement the pressure detection, and a half bridge circuit to implement the temperature compensation;

wherein the bridge circuit is electrically connected to a signal processing circuit to detect the deformation of the rigid structure and to obtain the force acting on the measured object, and wherein the output signal of each of the second sensors serves as the temperature compensation amount of the corresponding first sensor.

11. The pressure sensing method according to claim 10, wherein when the first and second installation surfaces of at least one of the strain amplification zones are respectively provided with two of the first sensors, and the first and second installation surfaces of the rigid block adjacent to the strain amplification zones are respectively provided with two of the second sensors, a variation of the output signal of the full-bridge circuit formed by connecting the four of the first sensors is set to be $\Delta U1$, a variation of the output signal of the full bridge circuit formed by connecting the four of the second sensors is set to be $\Delta U2$, the pressure signal after temperature compensation is F1, and an undetermined coefficient is $\beta$, then, $$F1 = \Delta U1 - \Delta U2/\beta;$$

or alternatively, when the first and second installation surfaces of at least one of the strain amplification zones are respectively provided with one first sensor, and the first and second installation surfaces of the rigid block adjacent to the strain amplification zone are respectively provided with one second sensor, a variation of the output signal at one detection terminal of the half-bridge circuit formed by connecting the two of the first sensors and the two of the second sensors is set to be $\Delta Vp1$, and a variation of the output signal at the other detection terminal is set to be $\Delta Vp2$, and the pressure signal after temperature compensation is F1, then, $$F1 = \Delta Vp1 - \Delta Vp2;$$

or alternatively, when the first and second installation surfaces of at least one of the strain amplification zones are respectively provided with two of the first sensors, and the first and second installation surfaces of the rigid block adjacent to the strain amplification zone are respectively provided with one second sensor, a variation of the output signal of the full-bridge circuit formed by connecting the four of the first sensors is set to be $\Delta U1$, and a variation of the output signal of the half-bridge circuit formed by connecting the two of the second sensors and the two of the first sensors disposed respectively on the first and second installation surfaces is set to be ΔU2, the pressure signal after temperature compensation is F1, and two undetermined coefficients are α and β, respectively, then, $$F1=(\Delta U2-\beta\Delta U1)/(a-B);$$

or alternatively, when the first and second installation surfaces of the at least two adjacent strain amplification zones are respectively provided with two of the first sensors, and the first and second installation surfaces of each of the rigid blocks adjacent to the strain amplification zones are respectively provided with one second sensor, a variation of the output signal of the full-bridge circuit formed by connecting the four of the first sensors corresponding to one of the strain amplification zones is set to be ΔU1, a variation of the output signal of the full bridge circuit formed by connecting the four of the first sensors corresponding to the other strain amplification zone is set to be ΔU2, a variation of the output signal of the full-bridge circuit formed by connecting the four of the second sensors arranged on two of the rigid blocks adjacent to one of the strain amplification zones is set to be ΔU3, and a variation of the output signal of the full-bridge circuit formed by connecting the four of the second sensors arranged on the two rigid blocks adjacent to the other strain amplification zone is set t be ΔU4, and two pressure signals after temperature compensation are Fa and Fb, then, $$Fa=\Delta U1-\Delta U3; Fb=\Delta U2-\Delta U4.$$

12. An equipment, comprising:
a measured object, and
a pressure sensing device comprising:
  a rigid structure attached to the measured object and configured to be deformed following deformation of the measured object, the rigid structure comprising:
  rigid blocks arranged at intervals along a predetermined direction, and
  strain amplification zones, each of which is formed between adjacent pairs of the rigid blocks,
  wherein the rigid structure has first and second installation surfaces arranged opposite to each other, and one of the first and second installation surfaces serves as a contact surface with the measured object; and force sensors, comprising:
  first sensors, arranged in the strain amplification zones and capable of following the deformation of the measured object; and
  second sensors, arranged on the rigid blocks and located adjacent to corresponding first sensors,
  wherein an output signal of each of the second sensors serves as a temperature compensation amount of a corresponding first sensor; at least one of the first sensors is respectively arranged on each of the first and second installation surfaces of the strain amplification zones; at least one of the second sensors is respectively arranged on each of the first and second installation surfaces of the rigid blocks; and wherein at least four of the force sensors are connected to form a bridge circuit electrically connected to a signal processing circuit to detect the deformation of the rigid structure and to obtain a force acting on the measured object,
  wherein, for at least one of the strain amplification zones formed between the adjacent pairs of the rigid blocks, a full-bridge circuit is provided to implement pressure detection, and another full-bridge circuit is provided to implement temperature compensation;
  or alternatively, for the at least one of the strain amplification zones formed between the adjacent pairs of the rigid blocks, a half-bridge circuit is provided to implement the pressure detection and the temperature compensation;
  or alternatively, for the at least one of the strain amplification zones formed between the adjacent pairs of the rigid blocks, a full bridge circuit is provided to implement the pressure detection, and a half bridge is added to implement the temperature compensation; or alternatively, for at least two of the strain amplification zones and the corresponding adjacent pairs of the rigid blocks, a first strain amplification zone is provided with a full bridge circuit to implement the pressure detection, and another full bridge circuit to implement the temperature compensation, and a second strain amplification zone is provided with another full bridge circuit to implement the pressure detection, and a half bridge circuit to implement the temperature compensation.

13. The equipment according to claim 12, wherein the pressure sensing device is attached to a surface of the measured object through a colloid.

* * * * *